(12) United States Patent
Perez et al.

(10) Patent No.: US 12,528,126 B2
(45) Date of Patent: Jan. 20, 2026

(54) ADDITIVE MANUFACTURING TECHNIQUES AND APPLICATIONS THEREOF

(71) Applicant: Kennametal Inc., Latrobe, PA (US)

(72) Inventors: Martin G. Perez, Latrobe, PA (US); Mark A. Garman, Latrobe, PA (US); James A. Hillebrecht, Latrobe, PA (US)

(73) Assignee: KENNAMETAL INC., Latrobe, PA (US)

( * ) Notice: Subject to any disclaimer, the term of this patent is extended or adjusted under 35 U.S.C. 154(b) by 671 days.

(21) Appl. No.: 17/786,278

(22) PCT Filed: Sep. 11, 2020

(86) PCT No.: PCT/US2020/050421
§ 371 (c)(1),
(2) Date: Jun. 16, 2022

(87) PCT Pub. No.: WO2021/126324
PCT Pub. Date: Jun. 24, 2021

(65) Prior Publication Data
US 2023/0059163 A1    Feb. 23, 2023

Related U.S. Application Data

(60) Provisional application No. 62/949,154, filed on Dec. 17, 2019.

(51) Int. Cl.
*B22F 10/66* (2021.01)
*B22F 3/04* (2006.01)
(Continued)

(52) U.S. Cl.
CPC ............ *B22F 10/66* (2021.01); *B22F 3/04* (2013.01); *B22F 3/14* (2013.01); *B22F 10/14* (2021.01);
(Continued)

(58) Field of Classification Search
CPC .... B22F 10/66; B22F 3/04; B22F 3/14; B22F 10/14; B22F 2003/145; B22F 2301/15;
(Continued)

(56) References Cited

U.S. PATENT DOCUMENTS 3,729,971 A    5/1973   Gurganus et al.
4,303,416 A   12/1981   Springborn
(Continued)

FOREIGN PATENT DOCUMENTS

CN    103071793 A    5/2013
CN    104907567 A    9/2015
(Continued)

OTHER PUBLICATIONS

Wentworth (1922) grain size classification, as published by the planetary society, https://www.planetary.org/space-images/wentworth-1922-grain-size (Year: 1922).*
(Continued)

*Primary Examiner* — Rebecca Janssen
(74) *Attorney, Agent, or Firm* — Christopher J. Owens

(57) ABSTRACT

In one aspect, additive manufacture techniques are described herein which enable the densification of green articles prior to further article processing. In some embodiments, a method of forming an article comprises providing a powder composition, and forming the powder composition into a green article by one or more additive manufacturing techniques. The green article is contacted with a powder pressure transfer media. The green article and powder pressure transfer media are then subjected to cold isostatic pressing (CIP)
(Continued)

or warm isostatic pressing (WIP) at a pressure less than minimum isostatic compaction pressure of the powder pressure transfer media to provide a densified green article.

22 Claims, 10 Drawing Sheets

(51) Int. Cl.
| | |
|---|---|
| *B22F 3/14* | (2006.01) |
| *B22F 10/14* | (2021.01) |
| *B33Y 10/00* | (2015.01) |
| *B33Y 40/20* | (2020.01) |
| *C22C 29/08* | (2006.01) |

(52) U.S. Cl.
CPC ............... *B33Y 10/00* (2014.12); *B33Y 40/20* (2020.01); *C22C 29/08* (2013.01); *B22F 2003/145* (2013.01); *B22F 2301/15* (2013.01); *B22F 2302/10* (2013.01)

(58) Field of Classification Search
CPC .. B22F 2302/10; B22F 3/15; B22F 2005/001; B22F 2998/00; B22F 2998/10; B22F 2999/00; B22F 2203/13; B22F 3/1021; B33Y 10/00; B33Y 40/20; B33Y 70/00; C22C 29/08; C22C 1/0433; C22C 29/06; C22C 33/0278; B30B 11/002; Y02P 10/25; B28B 1/001; B28B 3/025; B28B 3/003

See application file for complete search history.

(56) References Cited

U.S. PATENT DOCUMENTS

| | | | |
|---|---|---|---|
| 4,582,682 | A | 4/1986 | Betz et al. |
| 5,057,273 | A | 10/1991 | Hanson |
| 5,066,454 | A | 11/1991 | Hanson |
| 5,812,924 | A | 9/1998 | Shaffer et al. |
| 5,937,265 | A | 8/1999 | Pratt et al. |
| 11,065,862 | B2 | 7/2021 | Stoyanov et al. |
| 2001/0022944 | A1 | 9/2001 | Hinzpeter et al. |
| 2002/0136658 | A1 | 9/2002 | Dilmore et al. |
| 2004/0086415 | A1 | 5/2004 | Gubanich et al. |
| 2006/0165828 | A1 | 7/2006 | Smilovici et al. |
| 2009/0136776 | A1 | 5/2009 | Gubanich et al. |
| 2009/0169412 | A1 | 7/2009 | Samuelsson et al. |
| 2010/0007053 | A1 | 1/2010 | Yamaguchi et al. |
| 2010/0150672 | A1 | 6/2010 | Edler |
| 2012/0040183 | A1 | 2/2012 | Kelkar |
| 2013/0039798 | A1 | 2/2013 | Satran et al. |
| 2013/0039799 | A1 | 2/2013 | Bono et al. |
| 2013/0266681 | A1 | 10/2013 | Cripps |
| 2013/0279996 | A1 | 10/2013 | Mohseni |
| 2014/0356214 | A1 | 12/2014 | Staf |
| 2016/0121516 | A1 | 5/2016 | Bolander et al. |
| 2016/0158843 | A1 * | 6/2016 | Yolton ................. B22F 3/15 419/6 |
| 2016/0243621 | A1 | 8/2016 | Lucas et al. |
| 2016/0318812 | A1 | 11/2016 | Sterkenburg |
| 2017/0028470 | A1 | 2/2017 | Sterkenburg |
| 2017/0043397 | A1 | 2/2017 | Sterkenburg |
| 2017/0072469 | A1 | 3/2017 | Maderud et al. |
| 2017/0157673 | A1 | 6/2017 | Slattery |
| 2017/0246687 | A1 | 8/2017 | Schwarz et al. |
| 2018/0236687 | A1 | 8/2018 | Prichard et al. |
| 2018/0272432 | A1 | 9/2018 | Jonsson et al. |
| 2019/0084290 | A1 | 3/2019 | Stoyanov et al. |
| 2020/0346365 | A1 | 11/2020 | Wang et al. |
| 2021/0114123 | A1 | 4/2021 | Fang et al. |

FOREIGN PATENT DOCUMENTS

| | | | |
|---|---|---|---|
| CN | 113909490 | A | 1/2022 |
| EP | 0176266 | | 1/1991 |
| EP | 0459353 | | 12/1991 |
| EP | 0530222 | B1 | 1/1997 |
| GB | 1150820 | A | 5/1969 |
| GB | 341716 | A * | 12/1973 |
| GB | 1341716 | A | 12/1973 |
| JP | H07242909 | A | 9/1995 |
| KR | 20160066239 | | 6/2016 |
| KR | 101708490 | B1 | 2/2017 |
| SE | 2250729 | A1 | 6/2022 |
| WO | WO9008612 | A1 * | 8/1990 |
| WO | WO2001004384 | | 1/2001 |
| WO | 2016189312 | A2 | 12/2016 |
| WO | WO2018002282 | | 1/2018 |
| WO | WO2018069397 | | 4/2018 |
| WO | WO2018173048 | | 9/2018 |
| WO | WO2018189315 | | 10/2018 |
| WO | WO2019210285 | A2 | 10/2019 |

OTHER PUBLICATIONS

Mar. 20, 2023 Foreign Office Action Swedish Application No. SE20220050729 (Pub No. SE2250729A1), P19-06435-SE-PCT, 9 Pages.

International Search Report and Written Opinion corresponding to PCT/US2020/050421, mailed Dec. 23, 2020, 8 pages.

Oct. 18, 2024 Foreign Office Action Swedish Application No. SE20220050729, P19-06435-SE-PCT, 42 pages.

International Preliminary Report on Patentability for International Application No. PCT/US2020/050421, mailed Jun. 30, 2022, 7 Pages.

Supplementary European Search Report and Search Opinion for European Application No. 20903148.3, mailed Feb. 26, 2024, 17 Pages.

Dec. 12, 2024 Foreign Office Action Swedish Application No. SE20220050729, P19-06435-SE-PCT, 4 pages.

* cited by examiner

ADDITIVE MANUFACTURING TECHNIQUES AND APPLICATIONS THEREOF

RELATED APPLICATION DATA

The present application is a U.S. National Phase of PCT/US2020/050421, filed Sep. 11, 2020, which claims priority pursuant to Article 8 of the Patent Cooperation Treaty to U.S. Provisional Patent Application Ser. No. 62/949,154 filed Dec. 17, 2019, each of which is incorporated herein by reference in its entirety.

FIELD

The present invention relates to additive manufacturing techniques and, in particular, to additive manufacturing techniques employing cold isostatic pressing or warm isostatic pressing of green articles prior to sintering.

BACKGROUND

Additive manufacturing generally encompasses processes in which digital 3-dimensional (3D) design data is employed to fabricate an article or component in layers by material deposition and processing. Various techniques have been developed falling under the umbrella of additive manufacturing. Additive manufacturing offers an efficient and cost-effective alternative to traditional article fabrication techniques based on molding processes. With additive manufacturing, the significant time and expense of mold and/or die construction and other tooling can be obviated. Further, additive manufacturing techniques make an efficient use of materials by permitting recycling in the process and precluding the requirement of mold lubricants and coolant. Most importantly, additive manufacturing enables significant freedom in article design. Articles having highly complex shapes can be produced without significant expense allowing the development and evaluation of a series of article designs prior to final design selection.

SUMMARY

In one aspect, additive manufacture techniques are described herein which enable the densification of green articles prior to further article processing. In some embodiments, a method of forming an article comprises providing a powder composition, and forming the powder composition into a green article by one or more additive manufacturing techniques. The green article is contacted with a powder pressure transfer media. The green article and powder pressure transfer media are then subjected to cold isostatic pressing (CIP) or warm isostatic pressing (WIP) at a pressure less than minimum isostatic compaction pressure of the powder pressure transfer media to provide a densified green article. The densified green article is separated from the powder pressure transfer media and subjected to further processing, such as sintering and/or hot isostatic pressing (HIP).

These and other embodiments are further described in the following detailed description.

DETAILED DESCRIPTION

Figure 1A:
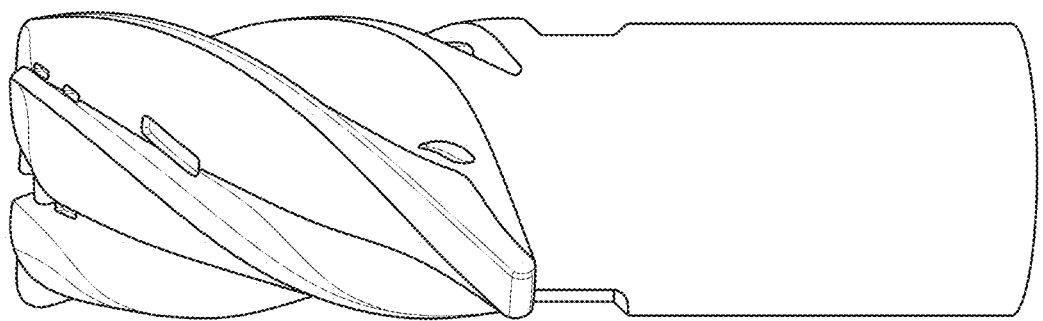
FIG. 1(a) is a picture of a green rotary cutting tool formed by binder jetting according to some embodiments described herein.

Embodiments described herein can be understood more readily by reference to the following detailed description and examples and their previous and following descriptions. Elements, apparatus and methods described herein, however, are not limited to the specific embodiments presented in the detailed description and examples. It should be recognized that these embodiments are merely illustrative of the principles of the present invention. Numerous modifications and adaptations will be readily apparent to those of skill in the art without departing from the spirit and scope of the invention.

As described herein, methods of forming an article comprise providing a powder composition, and forming the powder composition into a green article by one or more additive manufacturing techniques. In some embodiments, a powder composition comprises sintered cemented carbide particles. The sintered cemented carbide particles can have an apparent density of at least 6 g/cm³, in some embodiments. As known to one of skill in the art, apparent density is the mass of a unit volume of powder or particles in the loose condition, usually expressed in g/cm³. In some embodiments, sintered cemented carbide particles have apparent density of at least 7 g/cm³. Apparent density of sintered cemented carbide particles of powder compositions described herein can also have values selected from Table I.

TABLE I

Apparent Density of Sintered Cemented Carbide Particles

≥6.5 g/cm³
≥7.5 g/cm³
≥8 g/cm³
≥9 g/cm³
6-11 g/cm³
7-11 g/cm³
8-11 g/cm³

Apparent density of sintered cemented particles can be determined according to ASTM B212 Standard Test Method for Apparent Density of Free-Flowing Metal Powders using the Hall Flowmeter Funnel.

In addition to apparent density, sintered cemented carbide particles of powder compositions described herein can have tap density of at least 7 g/cm³. In some embodiments, sintered cemented carbide particles exhibit tap density having a value selected from Table II.

TABLE II

Tap Density of Sintered Cemented Carbide Particles

≥7.5 g/cm³
≥8 g/cm³
≥8.5 g/cm³
≥9.5 g/cm³
7-12 g/cm³
8-12 g/cm³
9-12 g/cm³

Tap density of sintered cemented carbide particles can be determined according to ASTM B527 Standard Test Method for Tap Density of Metal Powders and Compounds. In some embodiments, the ratio of tap density to apparent density (Hausner ratio) of sintered cemented carbide particles is 1.05 to 1.25. Hausner ratio of sintered cemented carbide particles, in some embodiments is 1.1 to less than 1.25.

In addition to apparent density and tap density, sintered cemented carbide particles described herein can have an average individual particle density of at least 80 percent theoretical density. In some embodiments, average individual particle density of the sintered cemented carbide particles is at least 90 percent or at least 95 percent theoretical density. Sintered cemented carbide particles can exhibit an average individual particle density of 80 to 95 percent theoretical density, in some embodiments. In further embodiments, sintered cemented carbide particles can exhibit an average individual particle density of 90 to 98 percent theoretical density.

As described further herein, the foregoing apparent densities, tap densities and individual particle densities can be achieved through one or several sintering processes administered to the particles. The sintering processes, in some embodiments, do not employ sintering inhibitor(s) to mitigate particle sticking or adhesion. Sintered cemented carbide particle properties described herein can be achieved in the absence of sintering inhibitor(s). In some embodiments, sintered cemented carbide particles are prepared by sintering a grade powder composition at temperatures of 1100° C. to 1400° C. for 0.5 to 2 hours to provide a sintered compact. The sintered compact is subsequently milled to provide individual sintered cemented carbide particles. Depending on particle morphology and density, the sintered cemented carbide particles can be further heat treated for further densification. Further heat treatment can include plasma densification, such as plasma spheroidization using an RF plasma torch or DC plasma torch. Alternatively, the sintered cemented carbide particles can be re-sintered forming a second compact. The second compact is milled to provide the sintered cemented carbide particles. Further densification treatments can be administered any desired number of times to provide sintered cemented carbide particles desired apparent densities, tap densities and/or individual particle densities. Sintering times and temperatures can be selected according to several considerations including, but not limited to, binder content of the cemented carbide particles, desired sintered particle density and sintering stage. In some embodiments, early sintering stages are conducted at lower temperatures and/or shorter times to facilitate milling the sintered compact. For example, an initial or early stage sintering process may be administered at temperatures below binder liquefaction. Late stage or final sintering processes may achieve higher temperatures, such as temperatures at which liquid phase sintering takes place.

Sintered cemented carbide particles can generally have an average size of 1 μm to 100 μm. In some embodiments, sintered cemented carbide particles have an average size selected from Table III.

TABLE III

Average Sintered Cemented Carbide Particle Size (μm)

5-90
5-50
10-75
10-50
5-40
20-40
0.5-2
1-5
1-10

Figure 2:
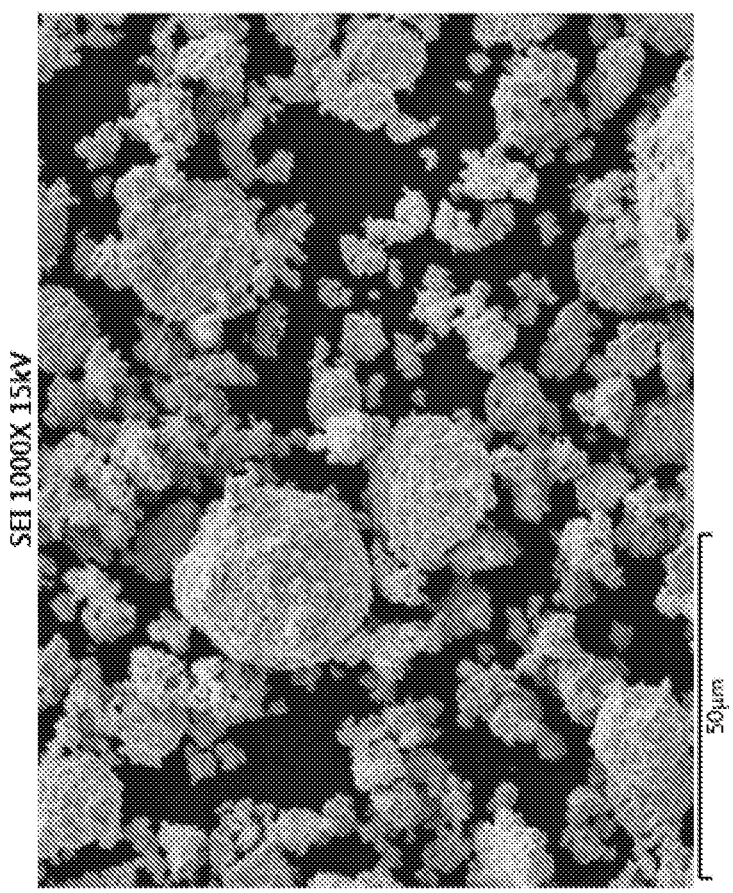
FIG. 2 is a scanning electron microscopy image (SEM) of a bimodal distribution of sintered cemented carbide particles having coarse:fine particle ratio of 70:30, according to some embodiments.
Figure 3:
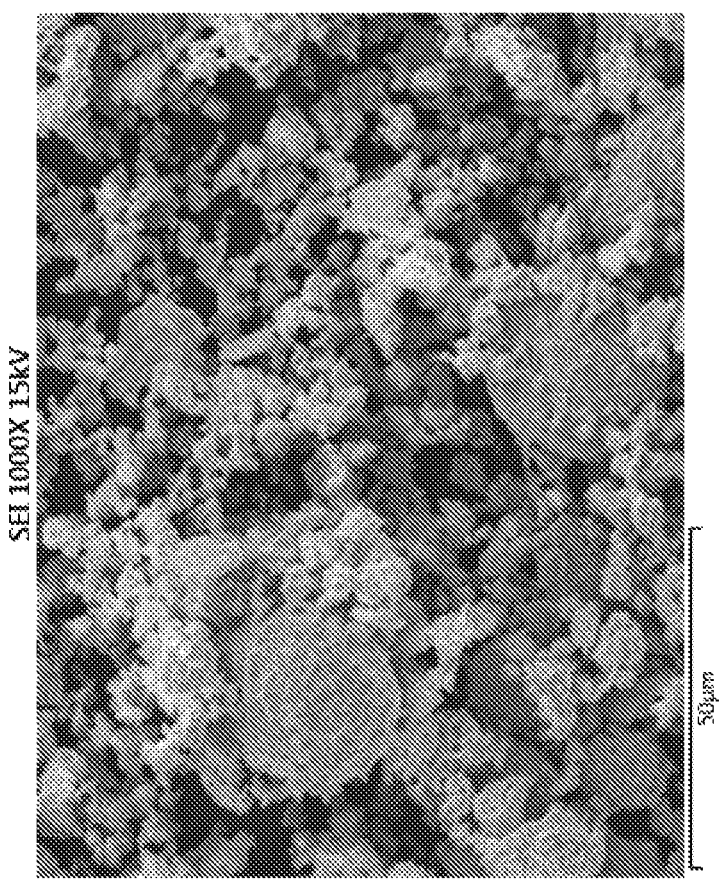
FIG. 3 is a SEM image of another bimodal distribution of sintered cemented carbide particles having coarse:fine particle ratio of 70:30, according to some embodiments.

Sintered cemented carbide particles can exhibit a Gaussian particle size distribution, in some embodiments. In other embodiments, sintered cemented carbide particles can have a polydisperse, bimodal or multi-modal particle size distribution. A bimodal particle size distribution, for example, can have any ratio of coarse particles to fine particles. In some embodiments, the coarse:fine particle ratio of 70:30 or 80:20. Coarse particles can have an average size greater than 20 μm, while fine particles have an average size less than 20 μm or less than 10 μm, in some embodiments. In some embodiments, the sintered cemented carbide particles exhibit a bimodal particle size distribution described in U.S. patent application Ser. No. 16/402,530 which is incorporated herein by reference in its entirety. The sintered cemented carbide particles, for example, can comprise a first mode having a D50 particle size of 25 μm to 50 μm, and a second mode having a D50 of less than 10 μm. Additionally, coarse and fine particles can have the same shape or different shapes. Particle shape can be spherical, polygonal or irregular. FIG. 2 is a scanning electron microscopy image (SEM) of a bimodal distribution of sintered cemented carbide particles having coarse:fine particle ratio of 70:30, according to some embodiments. The sintered cemented carbide particles contained 10 wt. % Co. FIG. 3 is also a SEM image of another bimodal distribution of sintered cemented carbide particles having coarse:fine particle ratio of 70:30, according to some embodiments. The sintered cemented carbide particles contained 12 wt. % Co. In further embodiments, sintered cemented carbide particles can be monodisperse or substantially monodisperse. In being substantially monodisperse, the cemented carbide particles are within ±10 percent or ±5 of the average particle size. In some embodiments, sintered cemented carbide particles are spherical or substantially spherical in shape. Alternatively, sintered cemented carbide particles can be a mixture of irregularly shaped particles with spherical or substantially spherical particles.

Sintered cemented carbide particles comprise one or more metal carbides selected from the group consisting of Group IVB metal carbides, Group VB metal carbides and Group VIB metal carbides. In some embodiments, tungsten carbide is the sole metal carbide of the sintered particles. In other embodiments, one or more Group IVB, Group VB and/or Group VIB metal carbides are combined with tungsten carbide to provide the sintered particles. For example, chromium carbide, titanium carbide, vanadium carbide, tantalum carbide, niobium carbide, zirconium carbide and/or hafnium carbide and/or solid solutions thereof can be combined with tungsten carbide in sintered particle production. Tungsten carbide can generally be present in the sintered particles in an amount of at least about 80 or 85 weight percent. In some embodiments, Group IVB, VB and/or VIB metal carbides other than tungsten carbide are present in the sintered particles in an amount of 0.1 to 5 weight percent.

In some embodiments, the sintered cemented carbide particles do not comprise double metal carbides or lower metal carbides. Double and/or lower metal carbides include, but are not limited to, eta phase ($Co_3W_3C$ or $Co_6W_6C$), $W_2C$ and/or $W_3C$. Moreover, sintered articles formed from sintered cemented carbide particles, in some embodiments, also do not comprise non-stoichiometric metal carbides. Additionally, the sintered cemented carbide particles can exhibit uniform or substantially uniform microstructure.

Sintered cemented carbide particles comprise metallic binder. Metallic binder of sintered cemented carbide particles can be selected from the group consisting of cobalt, nickel and iron and alloys thereof. In some embodiments, metallic binder is present in the sintered cemented carbide particles in an amount of 0.1 to 35 weight percent. Metallic binder can also be present in the sintered cemented carbide particles in an amount selected from Table IV.

TABLE IV

| Metallic Binder Content (wt. %) |
| --- |
| 0.1-20 |
| 0.1-10 |
| 0.5-15 |
| 1-10 |
| 3-20 |
| 5-15 |
| 12-15 |
| 10-35 |
| 15-35 |
| 15-25 |

Metallic binder of the sintered cemented carbide particles can also comprise one or more additives, such as noble metal additives. In some embodiments, the metallic binder can comprise an additive selected from the group consisting of platinum, palladium, rhenium, rhodium and ruthenium and alloys thereof. In other embodiments, an additive to the metallic binder can comprise molybdenum, silicon or combinations thereof. Additive can be present in the metallic binder in any amount not inconsistent with the objectives of the present invention. For example, additive(s) can be present in the metallic binder in an amount of 0.1 to 10 weight percent of the sintered cemented carbide particles.

Alternatively, the powder composition formed into the green article can comprise powder cobalt-based alloy. In some embodiments, the powder cobalt-based alloy has a composition selected from Table V.

TABLE V

| Composition of Co-based Powder Alloy | |
| --- | --- |
| Element | Amount (wt. %) |
| Chromium | 15-35 |
| Tungsten | 0-10 |
| Molybdenum | 0-3 |
| Nickel | 0-5 |
| Iron | 0-10 |
| Manganese | 0-3 |
| Silicon | 0-5 |
| Vanadium | 0-5 |
| Carbon | 0-4 |
| Boron | 0-5 |
| Cobalt | Balance |

The powder cobalt-based alloy, for example, can comprise 27-31 wt. % chromium, 2-5 wt. % tungsten, 1-3 wt. % nickel, 0.1-1 wt. % manganese, 0.5-3 wt. %-iron, 0.5-2 wt. % carbon, 0-2 wt. % silicon, 0-2 wt. % boron and the balance cobalt. In some embodiments, the cobalt-based powder alloy comprises one or more melting point reduction additives in an amount sufficient to permit sintering of the alloy powder in a temperature range of 1140° C. to 1210° C. Melting point reduction additive can be one or more elemental components of the powder alloy. In some embodiments, elemental melting point reduction additives include silicon and/or boron. The cobalt-based alloy, for example, may contain silicon and/or boron in individual amounts of 0.1-2 wt. %. Cobalt-based alloy powders are commercially available under the STELLITE® trade designation.

In further aspect, the powder composition may comprise any metal, alloy and/or ceramic consistent with the technical principles described herein. In some embodiments, for example, the powder composition formed into the green article can comprise nickel superalloys, aluminum, iron, various steels including tool steels and/or stainless steel, and titanium. Particle size of metal, alloy and/or ceramic powders can generally range from 1-100 μm. In some embodiments, the metal, alloy and/or ceramic particles have an average size selected from Table III herein.

In some embodiments, the powder composition comprises nickel-based alloy having compositional parameters selected from Table VI.

TABLE VI

| Nickel-based alloys | |
| --- | --- |
| Element | Amount (wt. %) |
| Chromium | 0-30 |
| Molybdenum | 0-28 |
| Tungsten | 0-15 |
| Niobium | 0-6 |
| Tantalum | 0-6 |
| Titanium | 0-6 |
| Iron | 0-30 |
| Cobalt | 0-15 |

TABLE VI-continued

Nickel-based alloys

| Element | Amount (wt. %) |
|---|---|
| Copper | 0-50 |
| Carbon | 0-2 |
| Manganese | 0-2 |
| Silicon | 0-10 |
| Phosphorus | 0-10 |
| Sulfur | 0-0.1 |
| Aluminum | 0-1 |
| Boron | 0-5 |
| Nickel | Balance |

In some embodiments, for example, nickel-based alloy comprises 18-23 wt. % chromium, 5-11 wt. % molybdenum, 2-5 wt. % total of niobium and tantalum, 0-5 wt. % iron, 0.1-5 wt. % boron and the balance nickel. Alternatively, nickel-based alloy comprises 12-20 wt. % chromium, 5-11 wt. % iron, 0.5-2 wt. % manganese, 0-2 wt. % silicon, 0-1 wt. % copper, 0-2 wt. % carbon, 0.1-5 wt. % boron and the balance nickel. Further, nickel-based alloy can comprise 3-27 wt. % chromium, 0-10 wt. % silicon, 0-10 wt. % phosphorus, 0-10 wt,% iron, 0-2 wt. % carbon, 0-5 wt. % boron and the balance nickel.

The powder composition may also comprise iron-based alloy. In some embodiments, iron-based alloy comprises 0.2-6 wt. % carbon, 0-30 wt. % chromium, 0-37 wt. % manganese, 0-16 wt % molybdenum, other alloying elements and the balance iron. In some embodiments, powder iron-based alloy has a composition according to Table VII.

TABLE VII

Iron-based alloys

| Fe-Based Alloy | Compositional Parameters (wt. %) |
|---|---|
| 1 | Fe-(2-6)% C |
| 2 | Fe-(2-6)% C-(0-5)% Cr-(29-37)% Mn |
| 3 | Fe-(2-6)% C-(0.1-5)% Cr |
| 4 | Fe-(2-6)% C-(0-37)% Mn-(8-16)% Mo |

The powder composition is formed into a green article by one or more additive manufacturing techniques. Any additive manufacturing technique operable to form the powder composition into a green article can be employed. In some embodiments, additive manufacturing techniques employing a powder bed are used to construct green articles formed of the powder composition. For example, binder jetting can provide a green article formed of the powder composition. In the binder jetting process, an electronic file detailing the design parameters of the green part is provided. The binder jetting apparatus spreads a layer of the powder composition in a build box. A printhead moves over the powder layer depositing liquid binder according to design parameters for that layer. The layer is dried, and the build box is lowered. A new layer of the powder composition is spread, and the process is repeated until the green article is completed. In some embodiments, other 3D printing apparatus can be used to construct the green article from the sintered cemented carbide powder in conjunction with organic binder.

Any organic binder not inconsistent with the objectives of the present invention can be employed in formation of the green article by one or more additive manufacturing techniques. In some embodiments, organic binder comprises one or more polymeric materials, such as polyvinylpyrrolidone (PVP), polyethylene glycol (PEG) or mixtures thereof. Organic binder, in some embodiments, is curable which can enhance strength of the green article. In some embodiments, filament deposition is an additive manufacturing technique to form the green article.

Once formed, the green article is contacted with a powder pressure transfer media. The powder transfer media can comprise metal powder, alloy powder, ceramic powder, polymeric powder, ionomer powder, elastomeric powders or mixtures thereof. In some embodiments, the powder pressure transfer media has a minimum isostatic compaction pressure of at least 5 ksi or at least 10 ksi. The powder pressure transfer media, for example, can have a minimum isostatic compaction pressure of 5-60 ksi or 10-60 ksi, in some embodiments. Moreover, in some embodiments, the powder pressure transfer media can exhibit a modulus of at least 200 GPa. Modulus of the powder pressure transfer media can be 200-800 GPa, for example. In some embodiments, the powder pressure transfer media comprises a carbide, nitride, carbonitride, or oxide of a metal selected from the group consisting or aluminum, silicon and metallic elements of Groups IVB-VIB of the Periodic Table. In some embodiments, the powder pressure transfer media can be selected from one or more compositions of Table VIII.

TABLE VIII

Powder Pressure Transfer Media

Stainless Steel
High Speed Tool Steel
Tungsten
WCx
WC-Co
Cobalt
Molybdenum
Chromium
Marble
SiAlON
Sand
Rubber In some embodiments, rubber powder pressure transfer media comprises a thermoset rubber. The thermoset rubber, for example, can include a ceramic component, such as silica or alumina. In some embodiments, the thermoset rubber comprises less than 10 wt. % amorphous silica or alumina. Suitable rubber pressure transfer media is commercially available from Soft Point Industries, Inc. of Copley, Ohio under the SoftSand trade designation.

In some embodiments, a modulus ratio of the powder composition forming the green article to the powder pressure transfer media is 0.5 to 5, such as greater than 1 to 5. For complex green article geometries including channels and/or other interior cavities, the powder pressure transfer media should exhibit modulus sufficient to maintain channel and/or cavity integrity throughout the cold or warm isotatic pressing procedure.

Powder transfer media can have any average particle size not inconsistent with the technical objectives described herein. Particle size of the powder pressure transfer media can be selected according to several considerations including, but not limited, to particle geometry, pore size of the green article, sizes of structural features of the green article and/or chemical identity of the pressure transfer media. In general, the powder pressure transfer media can have particle size greater than pore size of the green article, but less than the smallest structural feature of the green article. These size selection criteria can permit proper densification and resolution of structural features of the green article without the powder pressure transfer media being incorporated into the composition of the green article. The powder pressure transfer media, in some embodiments, has an average particle size of 10 µm to 500 µm or 20 µm to 200 µm. In some embodiments, the powder pressure transfer media can have a polydisperse, bimodal or multi-modal particle size distribution. A bimodal particle size distribution, for example, can have any ratio of coarse particles to fine particles. In some embodiments, the coarse:fine particle ratio is 70:30 or 80:20. Coarse particles can have an average size greater than 20 µm, while fine particles have an average size less than 20 µm or less than 10 µm, in some embodiments.

The powder pressure transfer media can have any desired particle shape or morphology not inconsistent with the technical objectives described herein. The powder pressure transfer media can be spherical, polygonal, irregular shaped or various mixtures thereof.

Figure 6B:
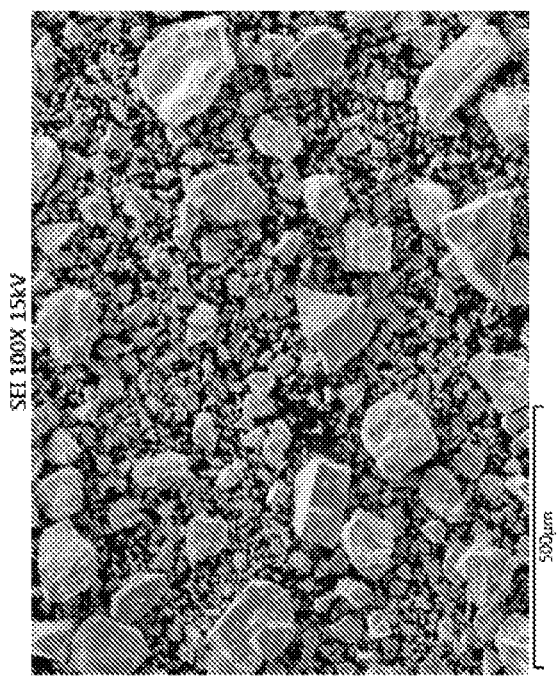
FIG. 6B is an SEM image of $WC_x$ pressure transfer media following CIP at 30 ksi, according to some embodiments.
Figure 6A:
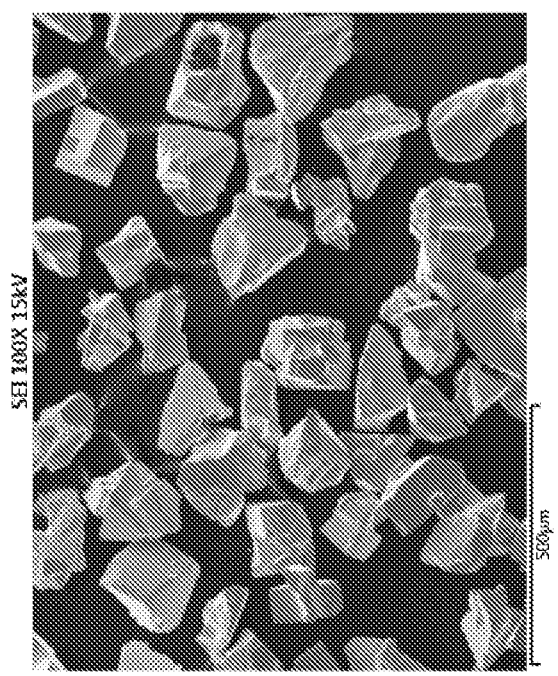
FIG. 6A is an SEM of virgin $WC_x$ pressure transfer media, according to some embodiments.

In some embodiments, the powder pressure transfer media can undergo partial comminution during CIP or WIP. FIG. 6A is an SEM of virgin $WC_x$ pressure transfer media, and FIG. 6B is an SEM image of $WC_x$ pressure transfer media following CIP at 30 ksi. As illustrated in FIG. 6B, particle size of the $WC_x$ pressure transfer media has been reduced. In some embodiments, powder pressure transfer media is employed in several CIP or WIP cycles prior to replacement.

Figure 4B:
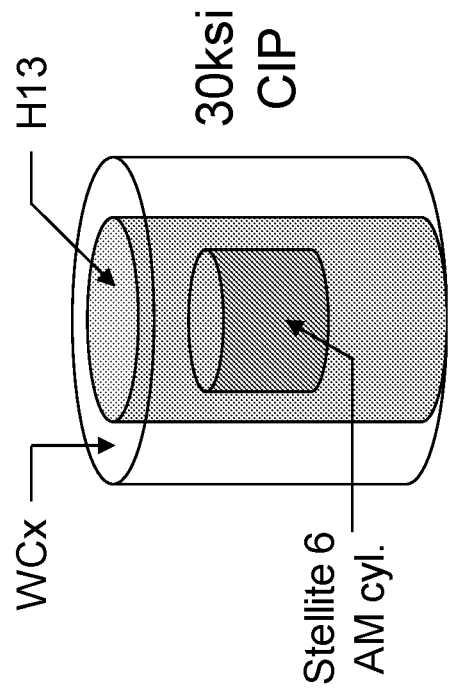
FIG. 4B illustrates one embodiment wherein H13 tool steel powder pressure transfer media is concentrically arranged around WC pressure transfer media relative to a green printed article comprising Co-based alloy.
Figure 4A:
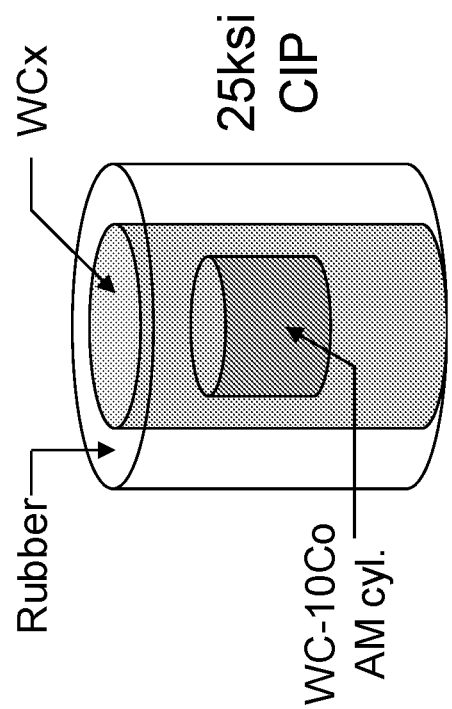
FIG. 4A illustrates one embodiment wherein rubber pressure transfer media is concentrically arranged around $WC_x$ pressure transfer media relative to a green printed article comprising WC-10Co.

In some embodiments, the powder pressure transfer media employs powder of a single chemical composition. Alternatively, the powder pressure transfer media is a mixture of two or more powder compositions of differing chemical compositions. Two or more powder transfer media can be combined to provide a homogeneous or heterogeneous mixture. In other embodiments, the two or more powder pressure transfer media can be arranged to provide a compositional gradient relative to the green article. Two or more powder transfer media, for example, can be arranged concentrically around the green article. FIG. 4A illustrates one embodiment wherein rubber pressure transfer media is concentrically arranged around $WC_x$ pressure transfer media relative to a green printed article comprising WC-10Co. FIG. 4B illustrates another embodiment wherein H13 tool steel powder pressure transfer media is concentrically arranged around $WC_x$ pressure transfer media relative to a green printed article comprising STELLITE® 6. Compositional gradients of the powder pressure transfer media can result in modulus gradients. In some embodiments of a modulus gradient, modulus of the pressure transfer media decreases in a direction approaching the green article. In other embodiments, modulus of the pressure transfer media increases in a direction approaching the green article. A modulus gradient can be continuous, in some embodiments. A pressure transfer media, for example, can comprise increasing amounts of a higher or lower modulus powder in the direction approaching the green article to provide a continuous gradient. A modulus gradient may also be stepped by one or more sharp transitions in composition of the powder pressure transfer media, as in the embodiments illustrated in FIGS. 4A and 4B.

As described further herein, the green article and powder pressure transfer media can be added to an elastomeric bag, wherein the green article is buried in the powder pressure transfer media. The green article can be in direct contact with the powder pressure transfer media. The elastomeric bag comprising the green article and powder pressure transfer media is then placed in an apparatus for cold isostatic pressing or warm isostatic pressing. The elastomeric bag comprising the green article and powder pressure transfer media is vacuum evacuated, sealed and placed in the CIP or WIP vessel. Oil/water mixture within the CIP or WIP vessel provides hydrostatic pressure for densification of the green article. WIP can take place at temperatures of 25° C. to 250° C. CIP or WIP can be administered for any time period consistent with the objectives of the present invention. In some embodiments, CIP or WIP is administered for 30 minutes to 120 minutes.

The green article and powder pressure transfer media are subjected to CIP or WIP at a pressure less than the minimum isostatic compaction pressure of the powder pressure media to provide the densified green article. In some embodiments, the compaction pressure is at least 5 ksi less than the minimum isostatic compaction pressure of the powder pressure transfer media. The compaction pressure, for example, can be 10-15 ksi less than the minimum compaction pressure of the powder transfer media. Depending on the compositional identity of the powder pressure transfer media, the compaction pressure can generally range from 5-60 ksi or 10-60 ksi. In some embodiments, the powder pressure transfer media or a portion thereof remains in a flowable state after CIP or WIP. The flowable state of the powder pressure transfer media facilitates separation of the densified green article from the powder pressure transfer media. In some embodiments, compacted portions of the powder transfer pressure media can be broken up by hand, vibration, and/or air flow.

Compact(s) formed by the powder transfer media following completion of CIP or WIP can have a crush strength less than 80 pound-force (lbf) or less than 50 lbf. A compact formed by the powder transfer media following completion of CIP or WIP can also exhibit a crush strength selected from Table IX.

TABLE IX

| Powder Transfer Media Compact Crush Strength (lbf) |
|---|
| 1-40 |
| 2-20 |
| 5-15 |
| 10-20 |
| 15-25 |

Crush strength of a compact or compacted region of powder pressure transfer media can result from several factors, including compositional identity of the powder media and/or amount of pressure applied in the CIP or WIP process. Low crush strengths of compacts formed by the powder pressure transfer media, as quantified by the lbf values herein, facilitate removal/separation of the media from the green article following CIP or WIP.

Figure 5C:
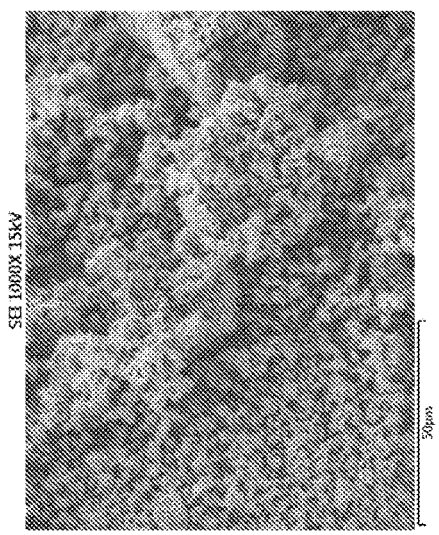
FIG. 5C is a SEM illustrating interlocking between particles of pressure transfer media comprising 95 vol. % cobalt and 5 vol. % rubber.
Figure 5B:
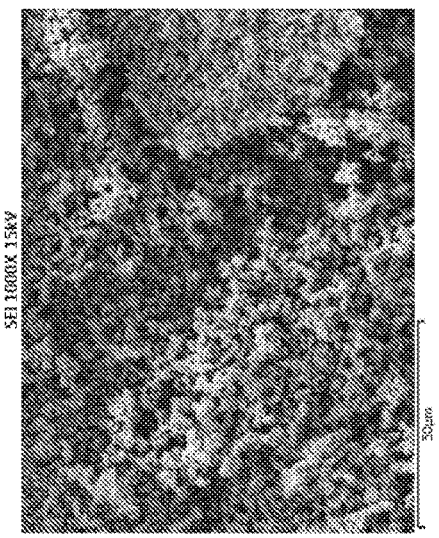
FIG. 5B is a SEM illustrating interlocking within chromium carbide powder pressure transfer media following CIP at 30 ksi.
Figure 5A:
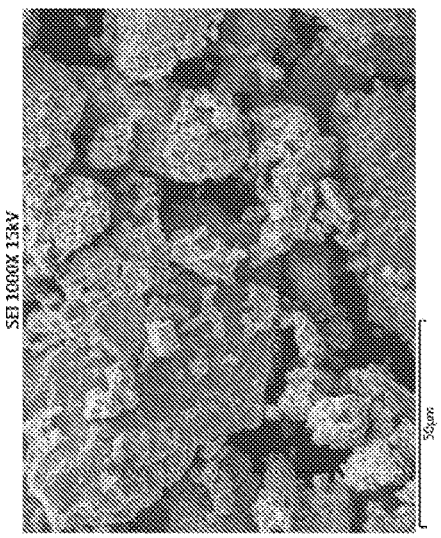
FIG. 5A is a SEM illustrating interlocking within chromium powder pressure transfer media following CIP at 30 ksi.

In some embodiments, the powder pressure transfer media can undergo cold welding and/or interlocking in response to pressures applied during CIP or WIP. Such cold welding and/or particle interlocking can increase crush strength of a compact formed by the powder pressure transfer media, thereby complicating or precluding removal from the green printed article following CIP or WIP. FIG. 5A is a SEM illustrating interlocking between particles of chromium pressure transfer media following CIP at 30 ksi. FIG. 5B is a SEM illustrating interlocking between particles of chromium carbide pressure transfer media following CIP at 30 ksi. Additionally, FIG. 5C is an SEM illustrating interlocking between particles of pressure transfer media comprising 95 vol. % cobalt and 5 vol. % rubber. This type of powder interlocking or cold welding can render the powder unsuitable for CIP and WIP methods described herein.

Moreover, the green article exhibits significantly higher crush strength after CIP or WIP relative to a compact formed by the powder pressure transfer media. In some embodiments, the green article exhibits a crush strength greater than 100 lbf after completion of CIP or WIP. The green article can also exhibit a crush strength having a value selected from Table X following CIP or WIP.

TABLE X

| Green Article Crush Strength (lbf) |
| --- |
| 120-1250 |
| 180-1200 |
| 200-900 |
| 250-750 |
| 600-1200 |
| 150-400 |
| 180-250 |

Crush strength of the green part following CIP or WIP can be dependent on several considerations, including CIP/WIP conditions, composition and/or geometry of the green article, and/or composition of the powder pressure transfer media.

In some embodiments, a ratio of crush strengths between the a compact of powder pressure transfer media and the green article (compact/green printed article) following CIP or WIP is less than 0.2. The crush strength ratio between compact of powder pressure transfer media and green article following CIP or WIP can also have a value selected from Table XI, in some embodiments.

TABLE XI

| Crush Strength Ratio |
| --- |
| 0.001-0.15 |
| 0.005-0.15 |
| 0.001-0.10 |
| 0.01-0.15 |
| 0.01-0.08 |

Compacts of powder pressure transfer media and green articles achieving the foregoing crush strength ratios can enable facile removal of the powder pressure transfer media from the green article without damage to the green article.

Following CIP or WIP, the densified green article can be greater than 55 percent theoretical density. As known to the skilled artisan, % theoretical density is based on 100% theoretical density of the powder material employed to form the green article. For example, if STELLITE® 6 is used to print the green article in the additive manufacturing technique, the percent theoretical density is determined against 8.33 g/cc, which is the 100% theoretical density of STELLITE® 6. In some embodiments, the densified green article is at least 57-65 percent theoretical density. The densified green article can also exhibit a density selected from Table XII, in some embodiments.

TABLE XII

| Green Article Density after CIP or WIP |
| --- |
| % Theoretical Density |
| 60-70 |
| 60-65 |

TABLE XII-continued

| Green Article Density after CIP or WIP |
| --- |
| % Theoretical Density |
| 61-64 |
| 61-69 |
| 60.5-67 |

Figure 7:
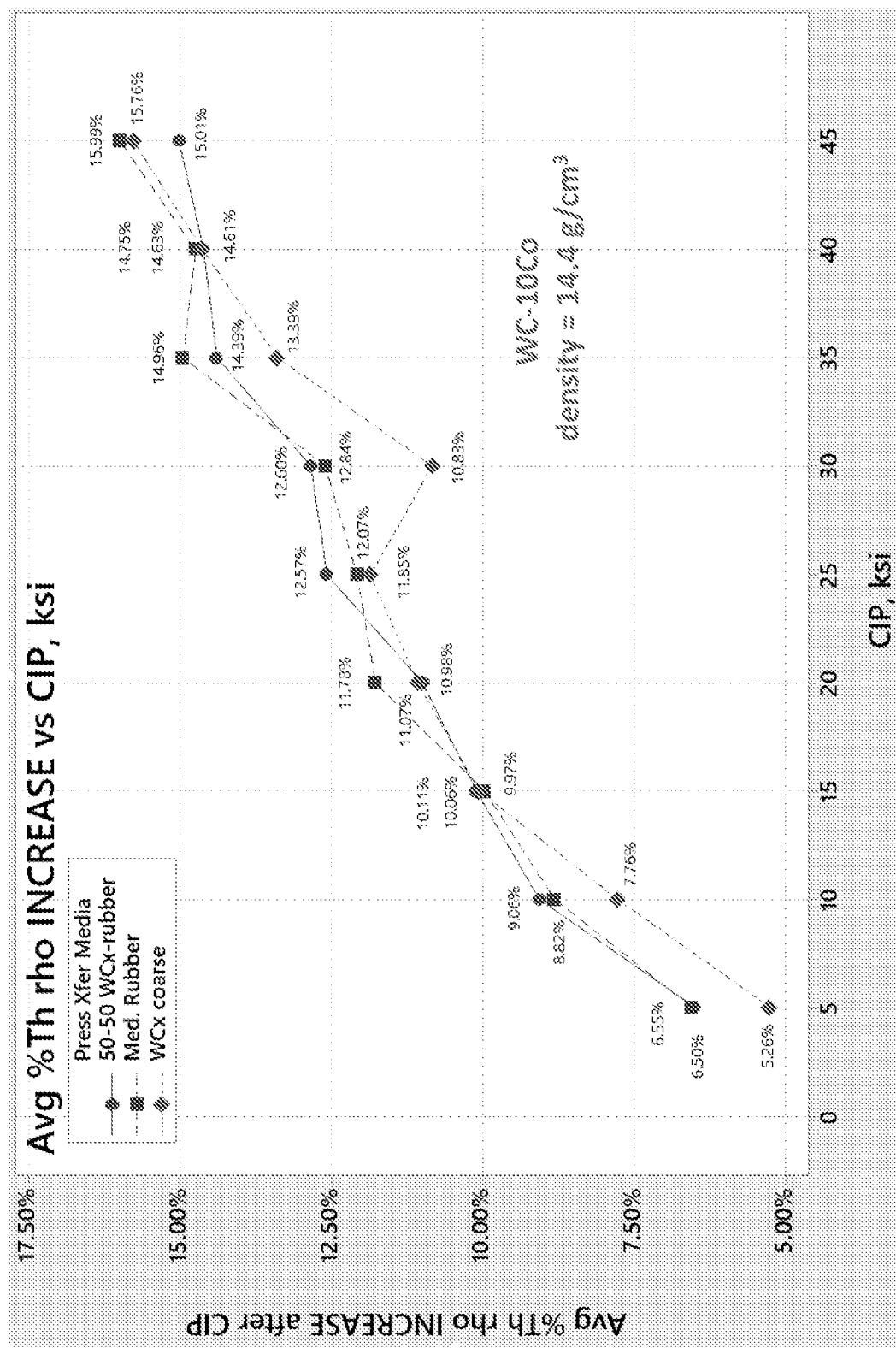
FIG. 7 illustrates increases in % theoretical density for green articles formed of WC-10Co powder subsequent to CIP at various pressures, according to some embodiments.
Figure 8:
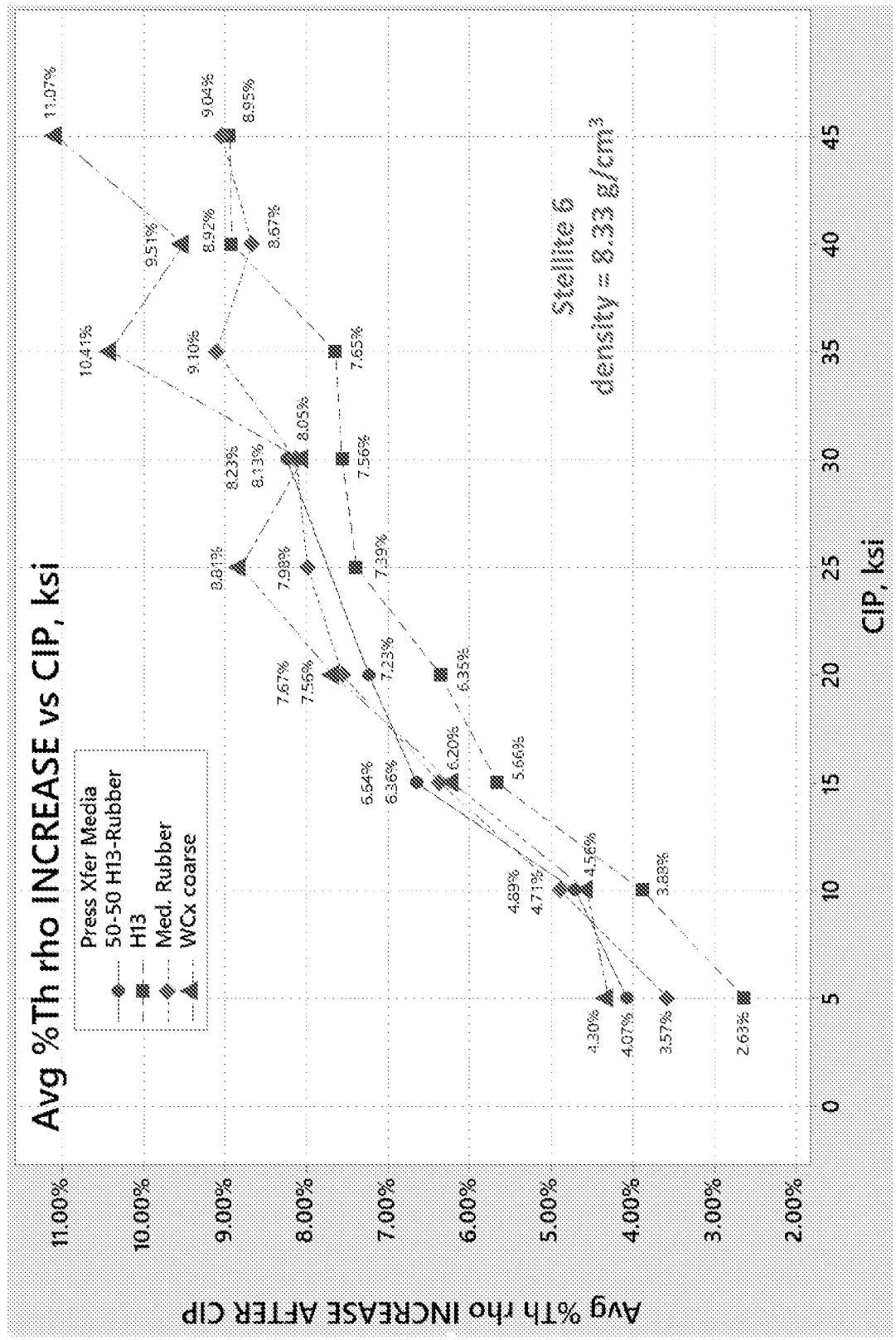
FIG. 8 illustrates increases in % theoretical density for green article formeds of cobalt alloy powder subsequent to CIP at various pressures, according to some embodiments.

In some embodiments, the green article achieves at least a 5% increase in % theoretical density following CIP. The green article, for example, can increase in % theoretical density by 6% to 20% or 7% to 17%, in some embodiments. FIG. 7 illustrates increases in % theoretical density for green AM articles formed of WC-10Co powder subsequent to CIP at various pressures, according to some embodiments. Data is provided for three types of powder pressure transfer media. Similarly, FIG. 8 illustrates increases in % theoretical density for green AM articles formed of STELLITE® 6 powder subsequent to CIP at various pressures, according to some embodiments. Data is provided for four types of powder pressure transfer media.

The densified green article is subsequently subjected to sintering and/or hot isostatic pressing to provide an article having the desired density. The densified green article can be vacuum sintered or sintered under a hydrogen or argon atmosphere at temperatures of 1100° C. to 1560° C. Moreover, sintering times can generally range from 10 minutes to 5 hours. In some embodiments, hot isostatic pressing (HIP) is added to the sintering process. Hot isostatic pressing can be administered as a post-sinter operation or during sintering. Hot isostatic pressing can be administered for up to 2 hours at pressures of 1 MPa to 100 MPa and temperatures of 1300° C. to 1560° C. Sintered articles described herein can exhibit densities greater than 98% theoretical full density. Density of a sintered article can be at least 99% theoretical full density. Moreover, microstructure of the sintered articles can be uniform, in some embodiments. Non-stoichiometric metal carbides, such as eta phase, $W_2C$ and/or $W_3C$, may also be absent in the sintered articles. Alternatively, sintered cemented carbide articles can comprise non-stoichiometric metal carbide(s) in minor amounts (generally <5 wt. % or <1 wt. %). Moreover, a sintered article described herein can have an average grain size less than 100 μm. In some embodiments, for example, a sintered article has an average grain size of 1-50 μm or 10-40 μm.

In some embodiments, a sintered article produced according to methods described herein exhibits less than 15 percent shrinkage or less than 10 percent shrinkage in one or more dimensions relative to the densified green article. Linear shrinkage of the sintered article in one more dimensions relative to the densified green article can also have a value selected from Table XIII.

TABLE XIII

| Linear Shrinkage of Sintered Article |
| --- |
| ≤9% |
| ≤5% |
| 5-10% |
| 1-10% |
| 1-5% |

Sintered articles produced according to methods described herein can be employed in a variety of industries including petrochemical, automotive, aerospace, industrial tooling, cutting tools, and manufacturing. In some embodiments, the sintered articles are used as components exposed to wear environments or abrasive operating conditions such as flow control components, pumps, bearings, valves, valve components, centrifuge components, disk stacks and/or fluid handling components. The sintered article can also comprise one or more internal fluid flow channels formed by the additive manufacturing technique. In some embodiments, sintered articles are near-net shape and/or require minimal post sintering processing to place the articles in final form. These and other embodiments are further illustrated by the following non-limiting examples.

Example 1—WC-Co Rotary Cutting Tool

Tungsten carbide (WC) particles were milled with powder cobalt to produce a grade composition of comprising 90 weight percent WC and 10 weight percent cobalt (WC-10Co). Subsequent to milling, the WC-10Co grade was spray dried and sieved to a −53 µm to +10 µm distribution. The sieved grade powder was vacuum sintered $10^{-3}$ torr) in the solid state at 1150-1200° C. for 1-2 hours, forming a lightly sintered compact. The compact was milled by an impact mill to provide sintered cemented carbide particles. This sintered cemented carbide powder was loaded into the chamber of ExOne 3D printing system, and printed into a green rotary cutting tool having the design illustrated in FIG. 1(a) and described in U.S. patent application Ser. No. 16/655,803, which is incorporated herein by reference in its entirety.

Figure 1B:
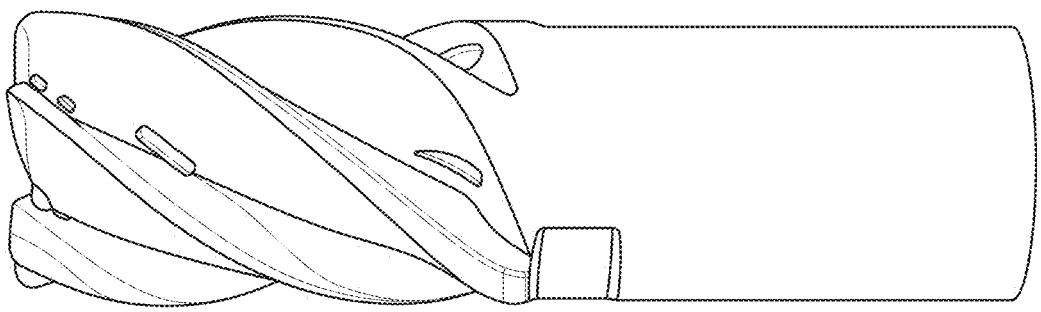
FIG. 1(b) is a picture of the green rotary cutting tool of FIG. 1(a) after densification by CIP according to some embodiments described herein.
Figure 1C:
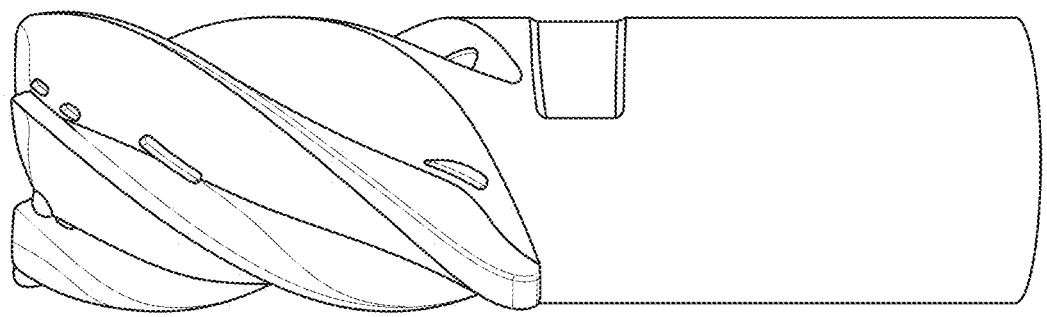
FIG. 1(c) is a picture of the densified green rotary cutting tool of FIG. 1(b) after sintering according to some embodiments described herein.

The green rotary cutting tool was buried in WCx powder pressure transfer media in an elastomeric bag followed by vacuum evacuation of the bag and sealing. The WCx powder had an average particle size of 30-35 µm. The sealed bag comprising the green rotary cutting tool and WCx powder pressure transfer media was placed in a CIP vessel and subjected to CIP at a pressure of 25 ksi for a time period of 90 seconds. The densified green rotary cutting tool was separated from the WCx powder pressure transfer media. Notably, at least a portion of the WCx powder pressure transfer media remained in the flowable state following CIP. Any compacted WCx powder was easily broken apart by hand. Additionally, the $WC_x$ powder pressure transfer media was removed from internal passages of the rotary cutting tool with air and/or vibration. The densified green rotary cutting tool was 59-60 percent theoretical density. FIG. 1(b) shows shrinkage of the densified green rotary cutting tool relative to the as-printed tool of FIG. 1(a).

The densified green rotary cutting tool was sinter-HIPped under argon at 1460-1500° C. for 0.75 hour. HIP pressure was 5-6 MPa The sintered rotary cutting tool was greater than 99 percent theoretical density.

Example 2—WC-10Co AM Cylinders

Sintered cemented tungsten carbide particles were prepared in accordance with Example 1. The sintered cemented carbide powder was loaded into the chamber of ExOne 3D printing system, and printed into green cylinders of Samples 1-24. The green cylinders were buried in the corresponding powder pressure transfer media listed in Table XIV in an elastomeric bag followed by vacuum evacuation and sealing. The sealed bag was placed in a CIP vessel and subject to CIP at the corresponding pressure listed in Table XIV for 90 seconds. The densified green cylinders were separated from the powder pressure transfer media. Crush strengths of the compacts formed by the powder pressure transfer media during CIP were measured. Moreover, crush strengths of the densified green cylinders were measured.

TABLE XIV

CIP WC-10Co AM Cylinders

| Sample | AM Article Material | Powder Pressure Transfer Media | Cold Isostatic Press Pressure (ksi) | Pressure Transfer Media Crush Strength (lbf) | AM Article Crush Strength (lbf) | Crush Strength Ratio (transfer media/AM Article |
|---|---|---|---|---|---|---|
| 1 | WC-10Co | $WC_x$ coarse | 10 | 6.6 | 229.2 | 0.029 |
| 2 | WC-10Co | 50-50 $WC_x$-rubber | 10 | 6.3 | 454.9 | 0.014 |
| 3 | WC-10Co | Med. Rubber | 10 | 4.1 | 445.1 | 0.009 |
| 4 | WC-10Co | $WC_x$ coarse | 15 | 11.2 | 315.0 | 0.036 |
| 5 | WC-10Co | 50-50 $WC_x$-rubber | 15 | 6.9 | 526.0 | 0.013 |
| 6 | WC-10Co | Med. Rubber | 15 | 3.9 | 415.3 | 0.009 |
| 7 | WC-10Co | $WC_x$ coarse | 20 | 14.2 | 262.2 | 0.054 |
| 8 | WC-10Co | 50-50 $WC_x$-rubber | 20 | 6.4 | 661.1 | 0.010 |
| 9 | WC-10Co | Med. Rubber | 20 | 2.1 | 707.3 | 0.003 |
| 10 | WC-10Co | $WC_x$ coarse | 25 | 72.6 | 355.0 | 0.205 |
| 11 | WC-10Co | 50-50 $WC_x$-rubber | 25 | 7.9 | 831.4 | 0.009 |
| 12 | WC-10Co | Med. Rubber | 25 | 3.7 | 874.3 | 0.004 |
| 13 | WC-10Co | $WC_x$ coarse | 30 | 19.8 | 272.7 | 0.073 |
| 14 | WC-10Co | 50-50 $WC_x$-rubber | 30 | 2.7 | 762.2 | 0.004 |
| 15 | WC-10Co | Med. Rubber | 30 | 2.8 | 942.6 | 0.003 |
| 16 | WC-10Co | $WC_x$ coarse | 35 | 13.4 | 567.7 | 0.024 |
| 17 | WC-10Co | 50-50 $WC_x$-rubber | 35 | 2.4 | 1229.5 | 0.002 |
| 18 | WC-10Co | Med. Rubber | 35 | 1.8 | 1235.1 | 0.001 |
| 19 | WC-10Co | $WC_x$ coarse | 40 | 4.8 | 593.6 | 0.008 |

TABLE XIV-continued

CIP WC-10Co AM Cylinders

| Sample | AM Article Material | Powder Pressure Transfer Media | Cold Isostatic Press Pressure (ksi) | Pressure Transfer Media Crush Strength (lbf) | AM Article Crush Strength (lbf) | Crush Strength Ratio (transfer media/AM Article) |
|---|---|---|---|---|---|---|
| 20 | WC-10Co | 50-50 WC$_x$-rubber | 40 | 1.8 | 1185.3 | 0.002 |
| 21 | WC-10Co | Med. Rubber | 40 | 1.4 | 959.9 | 0.001 |
| 22 | WC-10Co | WC$_x$ coarse | 45 | 22.0 | 980.1 | 0.022 |
| 23 | WC-10Co | 50-50 WC$_x$-rubber | 45 | 2.3 | 1158.2 | 0.002 |
| 24 | | Med. Rubber | 45 | 1.7 | 1062.1 | 0.002 |

WC$_x$ coarse pressure transfer media exhibited particle size of 45 μm to 180 μm. Med. rubber pressure transfer media was obtained commerically from Soft Point Industries, Inc. under the SoftSand trade designation. Average particle size of the Med. rubber pressure transfer media was 260-290 μm.

Figure 9:
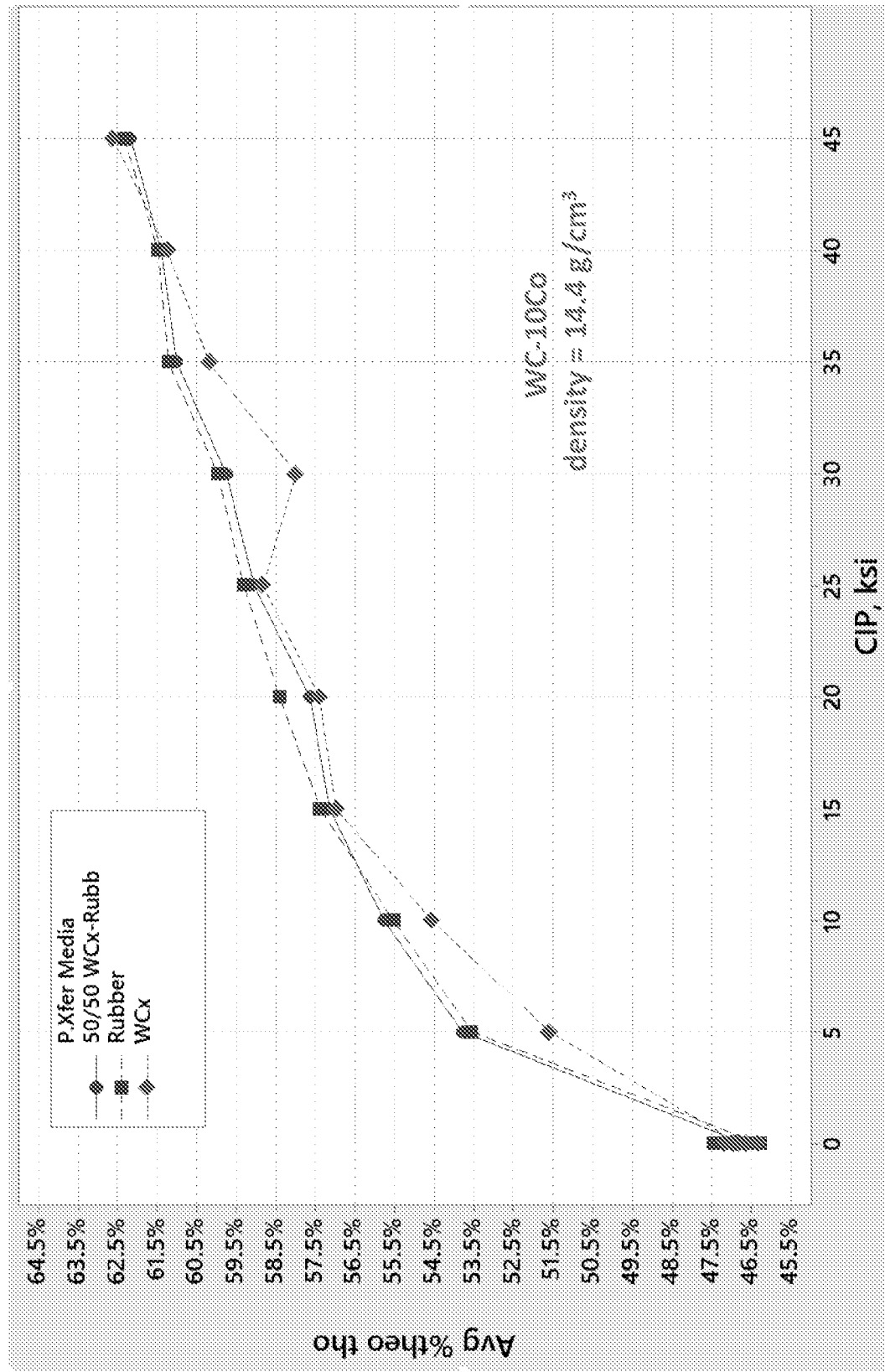
FIG. 9 illustrates % theoretical density for the green cylinders WC-10Co following CIP at various pressures, according to some embodiments.

FIG. 9 illustrates % theoretical density for the green cylinders following CIP at the various pressures.

Once removed from the powder pressure transfer media, the densified green cylinders were sinter-HIPped at 1460-1500° C. for 0.75 hour. HIP pressure was 5-6 MPa. The sintered AM cylinders greater than 99 percent theoretical density.

Example 3—Cobalt Alloy AM Cylinders

STELLITE® 6 powder was loaded into the chamber of ExOne 3D printing system, and printed into green cylinders of Samples 25-56. The green cylinders were buried in the corresponding powder pressure transfer media listed in Table XV in an elastomeric bag followed by vacuum evacuation and sealing. The sealed bag was placed in a CIP vessel and subject to CIP at the corresponding pressure listed in Table XV for 90 seconds. The densified green cylinders were separated from the powder pressure transfer media. Crush strengths of the compacts formed by the powder pressure transfer media during CIP were measured. Moreover, crush strengths of the densified green cylinders were measured.

TABLE XV

Cobalt Alloy AM Cylinders

| Sample | AM Article Material | Powder Pressure Transfer Media | Cold Isostatic Press Pressure (ksi) | Pressure Transfer Media Crush Strength (lbf) | AM Article Crush Strength (lbf) | Crush Strength Ratio (transfer media/AM Article) |
|---|---|---|---|---|---|---|
| 25 | Stellite 6 | WC$_x$ coarse | 10 | 6.6 | 307.0 | 0.021 |
| 26 | Stellite 6 | H13 powder | 10 | 5.7 | 239.0 | 0.024 |
| 27 | Stellite 6 | 50-50 H13-rubber | 10 | 8.9 | 340.2 | 0.026 |
| 28 | Stellite 6 | Med. Rubber | 10 | 4.1 | 231.1 | 0.018 |
| 29 | Stellite 6 | WC$_x$ coarse | 15 | 11.2 | 138.4 | 0.081 |
| 30 | Stellite 6 | H13 powder | 15 | 8.3 | 121.2 | 0.068 |
| 31 | Stellite 6 | 50-50 H13-rubber | 15 | 8.6 | 155.9 | 0.055 |
| 32 | Stellite 6 | Med. Rubber | 15 | 3.9 | 145.7 | 0.027 |
| 33 | Stellite 6 | WC$_x$ coarse | 20 | 14.2 | 141.1 | 0.101 |
| 34 | Stellite 6 | H13 powder | 20 | 12.8 | 133.1 | 0.096 |
| 35 | Stellite 6 | 50-50 H13-rubber | 20 | 7.9 | 163.0 | 0.048 |
| 36 | Stellite 6 | Med. Rubber | 20 | 2.1 | 167.8 | 0.012 |
| 37 | Stellite 6 | WC$_x$ coarse | 25 | 72.6 | 136.2 | 0.533 |
| 38 | Stellite 6 | H13 powder | 25 | 38.9 | 111.2 | 0.350 |
| 39 | Stellite 6 | 50-50 H13-rubber | 25 | 9.9 | — | — |
| 40 | Stellite 6 | Med. Rubber | 25 | 3.7 | 105.2 | 0.035 |
| 41 | Stellite 6 | WC$_x$ coarse | 30 | 19.8 | 222.7 | 0.089 |
| 42 | Stellite 6 | H13 powder | 30 | 7.9 | 205.9 | 0.038 |
| 43 | Stellite 6 | 50-50 H13-rubber | 30 | 3.5 | 262.1 | 0.014 |
| 44 | Stellite 6 | Med. Rubber | 30 | 2.8 | 270.5 | 0.010 |
| 45 | Stellite 6 | WC$_x$ coarse | 35 | 13.4 | 211.3 | 0.063 |
| 46 | Stellite 6 | H13 powder | 35 | 11.0 | 163.1 | 0.067 |
| 47 | Stellite 6 | 50-50 H13-rubber | 35 | 5.3 | — | — |
| 48 | Stellite 6 | Med. Rubber | 35 | 1.8 | 185.4 | 0.010 |
| 49 | Stellite 6 | WC$_x$ coarse | 40 | 4.8 | 173.6 | 0.028 |
| 50 | Stellite 6 | H13 powder | 40 | 6.6 | 141.7 | 0.046 |
| 51 | Stellite 6 | 50-50 H13- | 40 | 2.3 | — | — |

TABLE XV-continued

Cobalt Alloy AM Cylinders

| Sample | AM Article Material | Powder Pressure Transfer Media | Cold Isostatic Press Pressure (ksi) | Pressure Transfer Media Crush Strength (lbf) | AM Article Crush Strength (lbf) | Crush Strength Ratio (transfer media/AM Article |
|---|---|---|---|---|---|---|
| 52 | Stellite 6 | Med. Rubber | 40 | 1.4 | 159.8 | 0.009 |
| 53 | Stellite 6 | WC$_x$ coarse | 45 | 22.0 | 191.2 | 0.115 |
| 54 | Stellite 6 | H13 powder | 45 | 8.9 | 281.7 | 0.031 |
| 55 | Stellite 6 | 50-50 H13-rubber | 45 | 3.1 | — | — |
| 56 | Stellite 6 | Med. Rubber | 45 | 1.7 | 238.5 | 0.005 |

WC$_x$ coarse pressure transfer media exhibited particle size of 45 μm to 180 μm. Med. rubber pressure transfer media was obtained commerically from Soft Point Industries, Inc. under the SoftSand trade designation. Average particle size of the Med. rubber pressure transfer media was 260-290 μm.

Figure 10:
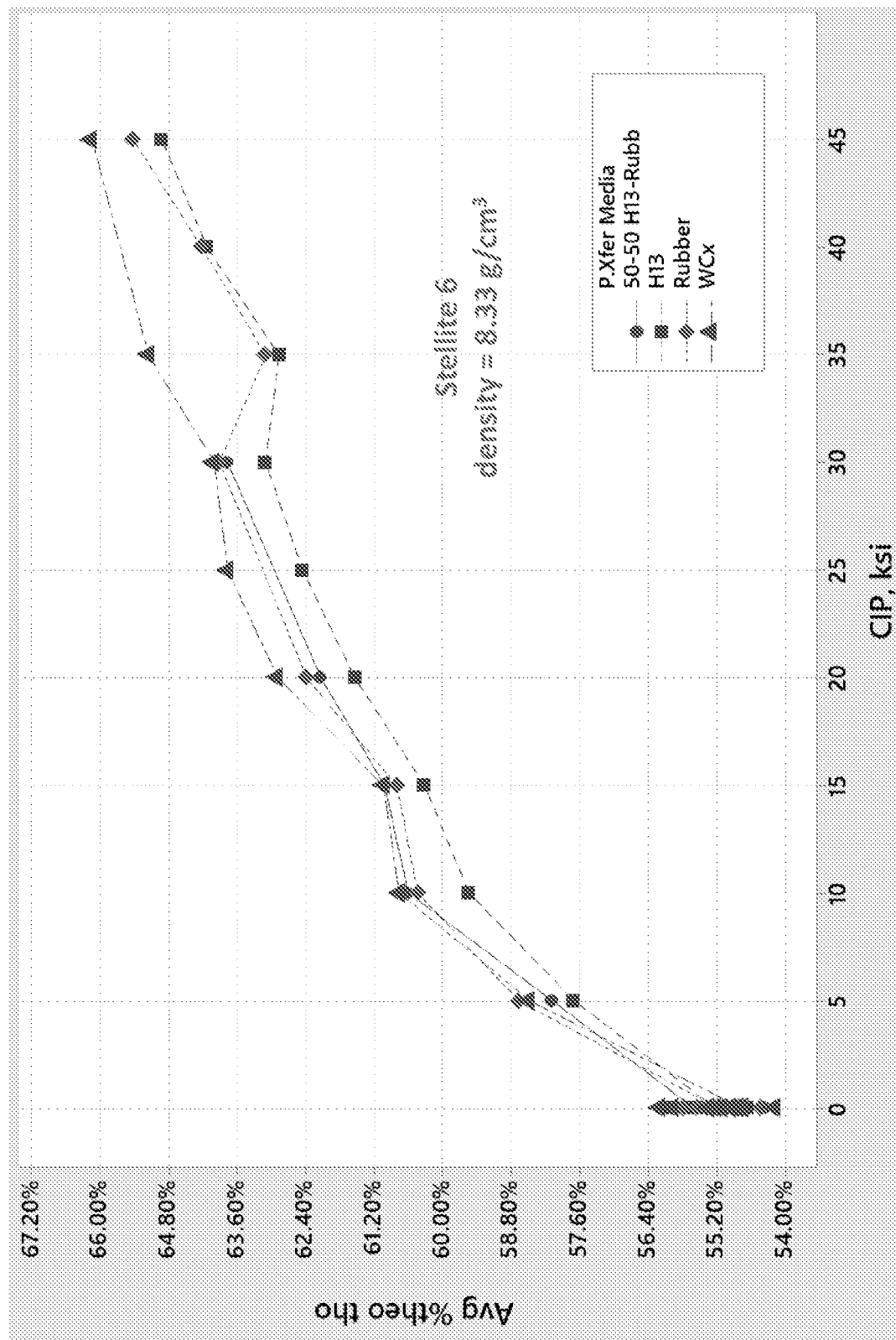
FIG. 10 illustrates % theoretical density for the green cylinders of Co-based alloy following CIP at various pressures, according to some embodiments.

FIG. 10 illustrates % theoretical density for the green cylinders following CIP at the various pressures.

Once removed from the powder pressure transfer media, the densified green cylinders were sintered in vacuum (<10$^{-3}$ torr) at 1190-1210° C. for 1 hour. The sintered AM cylinders greater than 99 percent theoretical density.

Various embodiments of the invention have been described in fulfillment of the various objects of the invention. It should be recognized that these embodiments are merely illustrative of the principles of the present invention. Numerous modifications and adaptations thereof will be readily apparent to those skilled in the art without departing from the spirit and scope of the invention.

The invention claimed is:

1. A method of forming an article comprising:
providing a powder composition, and forming the powder composition into a green article by one or more additive manufacturing techniques;
contacting the green article with a powder pressure transfer media that comprises an elastomeric powder and a metal powder, an alloy powder, a ceramic powder, a polymeric powder, an ionomer powder, or mixtures thereof, wherein the powder pressure transfer media has a polydisperse, bimodal, or multi-modal particle size distribution; and
subjecting the green article and powder pressure transfer media to cold isostatic pressing (CIP) or warm isostatic pressing (WIP) at a pressure less than minimum isostatic compaction pressure of the powder pressure transfer media to provide a densified green article, wherein CIP is performed at temperatures less than 25° C., and WIP is performed at temperatures of 25° C. to 250° C.

2. The method of claim 1, wherein the densified green article is greater than 55 percent theoretical density.

3. The method of claim 1, wherein the densified green article is 60-69 percent theoretical density.

4. The method of claim 1, wherein the powder composition comprises sintered cemented carbide particles.

5. The method of claim 1, wherein the powder composition comprises cobalt alloy.

6. The method of claim 1, wherein the green article is produced by binder jetting.

7. The method of claim 1, wherein the powder pressure transfer media has a modulus of at least 200 GPa.

8. The method of claim 1, wherein the powder pressure transfer media has a modulus of 200-800 GPa.

9. The method of claim 1, wherein the pressure is at least 5 ksi less than the minimum isostatic compaction pressure of the powder pressure transfer media.

10. The method of claim 1, wherein the pressure is 5-60 ksi.

11. The method of claim 1, wherein the powder pressure transfer media has an average particle size of 10-200 μm.

12. The method of claim 1, wherein the powder pressure transfer media forms a compact during the CIP or WIP having a crush strength less than 80 pound force (lbf).

13. The method of claim 12, wherein a ratio of crush strength of the compact to crush 10 strength of the densified green article is less than 0.2.

14. The method of claim 13, wherein the ratio is 0.001 to 0.15.

15. The method of claim 1 further comprising separating the densified green article from the powder pressure transfer media.

16. The method of claim 1, wherein a modulus ratio of the powder composition to the powder pressure transfer media is 0.5 to 1.5.

17. The method of claim 15, wherein at least a portion of the powder pressure transfer media remains in a flowable state after CIP.

18. The method of claim 1, wherein the powder pressure transfer media comprises a ceramic, an alloy or mixtures thereof.

19. The method of claim 1, wherein the powder pressure transfer media comprises an elastomeric powder and a metal powder.

20. The method of claim 15 further comprising sintering the densified green article to provide a sintered article.

21. The method of claim 20, wherein the sintered article is at least 98 percent theoretical density.

22. The method of claim 20, wherein the sintered article is at least 99 percent theoretical density.

* * * * *